United States Patent [19]

Machida et al.

[11] Patent Number: 5,009,125
[45] Date of Patent: Apr. 23, 1991

[54] SPEED CONTROL STRUCTURE

[75] Inventors: Satoshi Machida; Akio Hattori, both of Osaka, Japan

[73] Assignee: Kubota Ltd., Osaka, Japan

[21] Appl. No.: 431,019

[22] Filed: Nov. 1, 1989

[30] Foreign Application Priority Data

| Jan. 26, 1989 [JP] | Japan | 1-19309 |
| Jan. 27, 1989 [JP] | Japan | 1-18293 |
| Feb. 3, 1989 [JP] | Japan | 1-26278 |

[51] Int. Cl.$^5$ .................. F16H 57/02; F16H 5/12
[52] U.S. Cl. ............... 74/606 R; 192/3.57; 475/303
[58] Field of Search ........... 192/3.57, 3.61, 3.63, 192/0.08; 74/606 R; 475/302, 303, 343, 340

[56] References Cited

U.S. PATENT DOCUMENTS

| 4,782,719 | 11/1988 | Yarnell | 74/606 R |
| 4,796,486 | 1/1989 | Binger et al. | 74/606 R |
| 4,805,490 | 2/1989 | Fuehrer et al. | 74/606 R |

FOREIGN PATENT DOCUMENTS

| 52-251 | 3/1987 | Japan | 74/606 R |
| 2182403 | 5/1987 | United Kingdom | 74/606 R |

Primary Examiner—Allan D. Herrmann
Assistant Examiner—Khoi Q. Ta
Attorney, Agent, or Firm—Gifford, Groh, Sprinkle, Patmore and Anderson

[57] ABSTRACT

A speed control structure for a working vehicle comprises a hydraulic clutch, a main change speed device and an auxiliary change speed device mounted in a transmission case. A hydraulic control system includes hydraulic actuators for operating the change speed devices, a speed control valve for controlling the actuators, a pilot operated switch valve operatively connected to the actuators for disengaging the clutch at start of a change speed operation by the actuators, and engaging the clutch upon completion of the change speed operation, and a pilot control valve for controlling a pilot pressure for the switch valve in response to the operation of the actuators. The transmission case defines a lateral opening closed by a lid. The lid carries the actuators mounted on an inside face thereof, the switch valve and the speed control valve mounted on an outside face thereof, and the pilot control valve mounted in an interior thereof.

3 Claims, 9 Drawing Sheets

SPEED CONTROL STRUCTURE

BACKGROUND OF THE INVENTION (1) Field of the Invention

The present invention relates to a vehicle speed control structure including a hydraulic clutch mounted on a propelling transmission line, a hydraulic actuator provided as part of a change speed apparatus, and a pilot operated switch valve mounted on an oil line extending to the hydraulic clutch. The switch valve is operatively connected to the hydraulic actuator for disengaging the hydraulic clutch upon start of a change speed operation by the actuator and engaging the clutch upon completion thereof. In particular, the invention relates to a hydraulic control system for controlling the hydraulic clutch and actuator.

(2) Description of the Prior Art

A known speed control structure as noted above is disclosed in Japanese Utility Model Publication No. 62-40351, for example. In this publication, a transmission case has a wall defining an opening which is closed by a lid. The lid carries a hydraulic actuator, a control valve for effecting change speed, and a pressure control mechanism for adjusting clutch pressure, all mounted on an inward face of the lid.

The lid is relatively large since these hydraulic devices are in a planar arrangement, and accordingly the opening defined in the wall of the transmission case is large. Thus, there is room for improvement in that the large opening tends to reduce the strength of the transmission case per se.

Further, the hydraulic actuator, control valve and the like mounted on the lid are interconnected by long piping. Since long piping presents considerable resistance to oil flows, delays tend to occur in the operation of the actuator. Improvement is desired in this sense also.

SUMMARY OF THE INVENTION

An object of the present invention is to provide an improved speed control structure which allows the opening in the transmission case to have a reduced size to avoid a reduction in the strength of the transmission case, and which reduces the oil line resistance for the hydraulic devices provided for change speed purposes.

In order to achieve the above object, a speed control structure according to the present invention comprises change speed means including a hydraulic clutch; a transmission case for housing the change speed means and defining an opening; a lid for closing the opening; and hydraulic control means for controlling the hydraulic clutch, the hydraulic control means including hydraulic actuator means for effecting change speed, a speed control valve for controlling the hydraulic actuator means, a pilot operated switch valve mounted on an oil line extending to the hydraulic clutch and operatively connected to the hydraulic actuator means for disengaging the hydraulic clutch at start of a change speed operation by the hydraulic actuator means, and engaging the hydraulic clutch upon completion of the change speed operation, and a pilot control valve for controlling a pilot pressure for the switch valve in response to the operation of the hydraulic actuator means; wherein the lid carries the hydraulic actuator means mounted on an inside face thereof, the switch valve and the speed control valve mounted on an outside face thereof, and the pilot control valve mounted in an interior thereof.

The features noted above may be constructed as shown in FIGS. 1 through 3, 8 and 9, in which the lid 20 carries the hydraulic actuator means T mounted on an inside face thereof, the switch valve 9 and the speed control valve 10 mounted on an outside face thereof, and the pilot control valve 112 mounted in an interior thereof. The three layer arrangement of the hydraulic devices one over the other realizes a reduction in the size of the lid 20 and in the length of oil lines extending among the hydraulic devices.

Consequently, the transmission case now defines a small opening to maintain a good strength, with a reduced oil line resistance for the hydraulic devices, which is achieved by a modification consisting in relocation or rearrangement of the hydraulic devices.

In a preferred embodiment of the invention the change speed means includes a synchromesh main change speed device for changing an engine output into a plurality of speeds, and a synchromesh auxiliary change speed device for transmitting the engine output in a plurality of speeds to propelling devices. The main change speed device and the auxiliary change speed device are arranged longitudinally of a vehicle body with the hydraulic clutch disposed in between. Shift rods linked with change speed sections of the main change speed device and the auxiliary change speed device, respectively, extend to positions adjacent the hydraulic clutch. The opening is disposed to allow exposure of extension ends of the shift rods and the hydraulic clutch.

The above features may be constructed as shown in FIGS. 1 through 4. Shift rods 17 and 19 have ends thereof linked with the hydraulic actuator means T at positions adjacent the hydraulic clutch B. The hydraulic actuator means T can carry out change speed operations where the opening 14a has a size to expose the hydraulic clutch B and its vicinity. Since piping may be provided for the hydraulic clutch B through this opening 14a, the hydraulic clutch B is operable with the hydraulic actuator means T.

Thus the transmission case need not define an opening extending from the main change speed device A to the auxiliary change speed device D to enable change speed and clutch operations.

In this way the present invention provides an improvement in the speed control system which reduces the size of the opening defined in the transmission case. Accordingly, the transmission case has a sufficient strength even if the case has a smaller wall thickness than in the prior art.

The structure provided by the present invention is particularly advantageous in that, since the opening is defined in a position for exposing the hydraulic clutch, the clutch may be linked with the hydraulic control system with a minimum distance therebetween to effect a quick operation.

The hydraulic clutch may be interposed between an output shaft of the main change speed device and an input shaft of the auxiliary change speed device. In this case, the hydraulic clutch may include a clutch case relatively rotatably mounted on the input shaft to receive drive from the output shaft, the clutch case having a hydraulic piston and a plurality of first friction plates; a holder supporting a plurality of second friction plates arranged between the first friction plates for transmitting the drive to the input shaft; and oil passages defined between an outer periphery of the input shaft and the clutch case for supplying lubricating oil to the first and second friction plates.

The above features may be constructed as shown in FIG. 5. The components of the hydraulic clutch B that impart inertial forces to the input shaft are the holder 128 and the friction plates 127b supported by the holder 128. Further, the drive may be transmitted from the output shaft 129 through a transmission member 30 to outer peripheries of the clutch case 23A. The clutch case 23A may, therefore, be formed of a material of low strength.

That is, the present invention allows the clutch case 23A to rotate with the output shaft 129 to prevent a great inertial force from being produced from the hydraulic clutch B at times of backward/forward drive switching. Besides, the invention allows the clutch case 23A to be manufactured by aluminum die-casting, which is made possible by selecting the above-noted positions of the clutch case 23A to which the drive is transmitted from the transmission member 30.

According to the present invention, the oil passages 35 are defined between an outer periphery of the input shaft 22 and the clutch case 23A for supplying lubricating oil. Thus, lubricating oil, besides being supplied between the input shaft 22 and clutch case 23A, flows to the friction plates 127a and 127b from an inward position of the hydraulic clutch B, which is achieved without forming oil passages on the output shaft 129.

In this way the present invention provides an improvement for allowing a hydraulic clutch to be manufactured relatively easily, which clutch is effective to reduce the synchronizing time even at times of backward/forward drive switching. Further, the hydraulic clutch is smoothly operable, with simple shaping work to supply the lubricating oil to promote smooth rotation of the clutch case and to prevent inertial rotation of the friction plates.

Other features and advantages of the present invention will be apparent from the following description.

BRIEF DESCRIPTION OF THE DRAWINGS

The drawings show a speed control structure according to the present invention, in which.

DESCRIPTION OF THE PREFERRED EMBODIMENT

An embodiment of the present invention will be described hereinafter with reference to the drawings.

Figure 6:
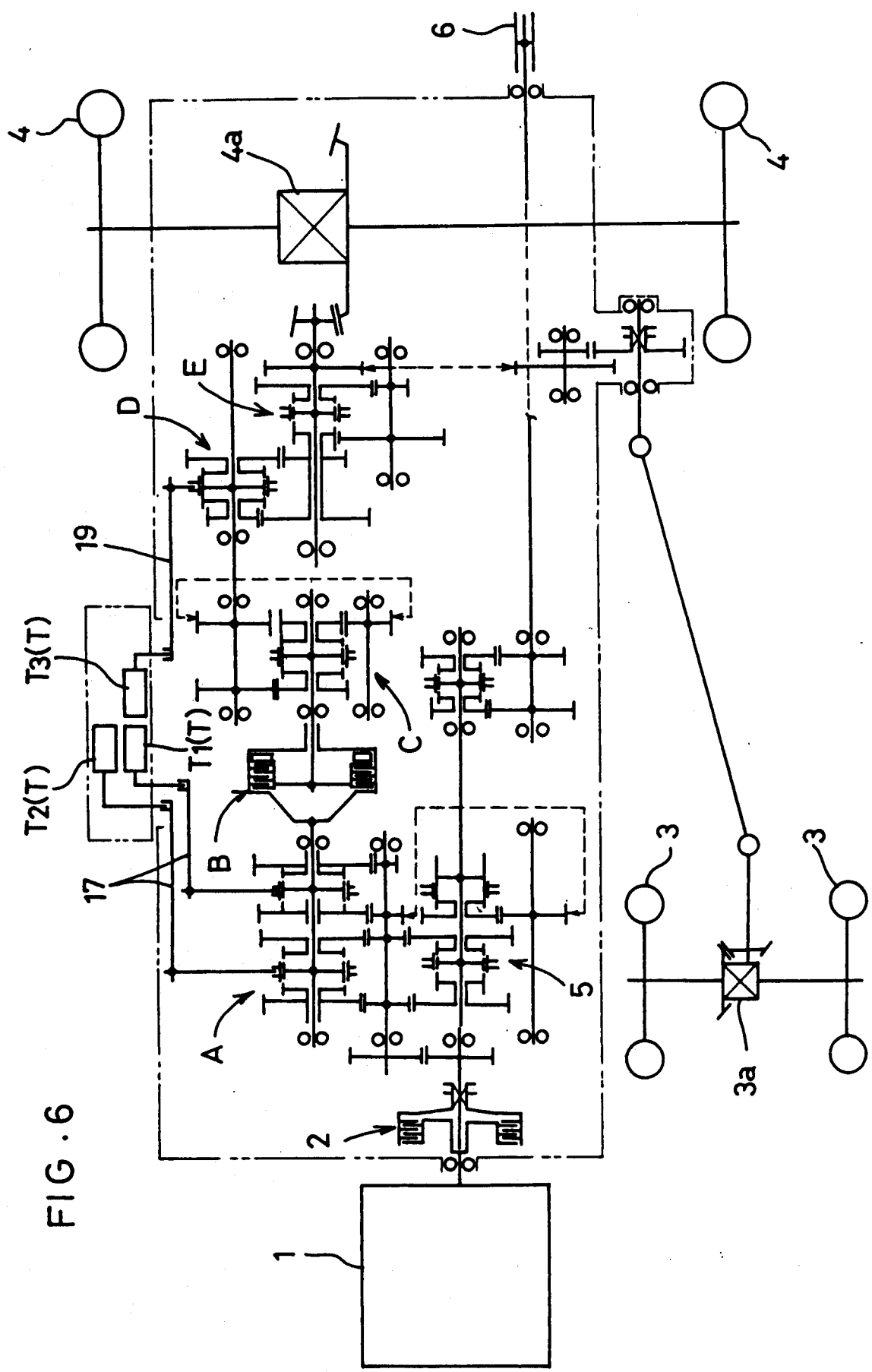
FIG. 6 is a diagram of a transmission system.

Referring to FIG. 6, a four wheel drive agricultural tractor comprises an engine 1, and a multidisk type main clutch 2 for transmitting engine output to a propelling line and to a power takeoff line. The propelling line includes a main change speed device A, a multidisk type hydraulic clutch B, a backward/forward changeover device C, an auxiliary change speed device D, a super-reduction device E, and differentials 3a and 4a for driving front and rear wheels 3 and 4, respectively. The power takeoff line includes a change speed device 5 for transmitting the engine output to a power output shaft 6.

The main change speed device A includes two synchromesh gearings for providing four speeds. The backward/forward changeover device C and auxiliary change speed device D each include a synchromesh gearing. The main change speed device A is operable by two hydraulic cylinders T1 and T2, the auxiliary change speed device D by a single hydraulic cylinder T3, and the backward/forward changeover device C is manually operable. This agricultural tractor has a hydraulic control system for disengaging the hydraulic clutch B at start of a change speed or drive changeover operation and engaging the clutch B upon completion thereof, so that the main clutch 2 may remain engaged.

Figure 7:
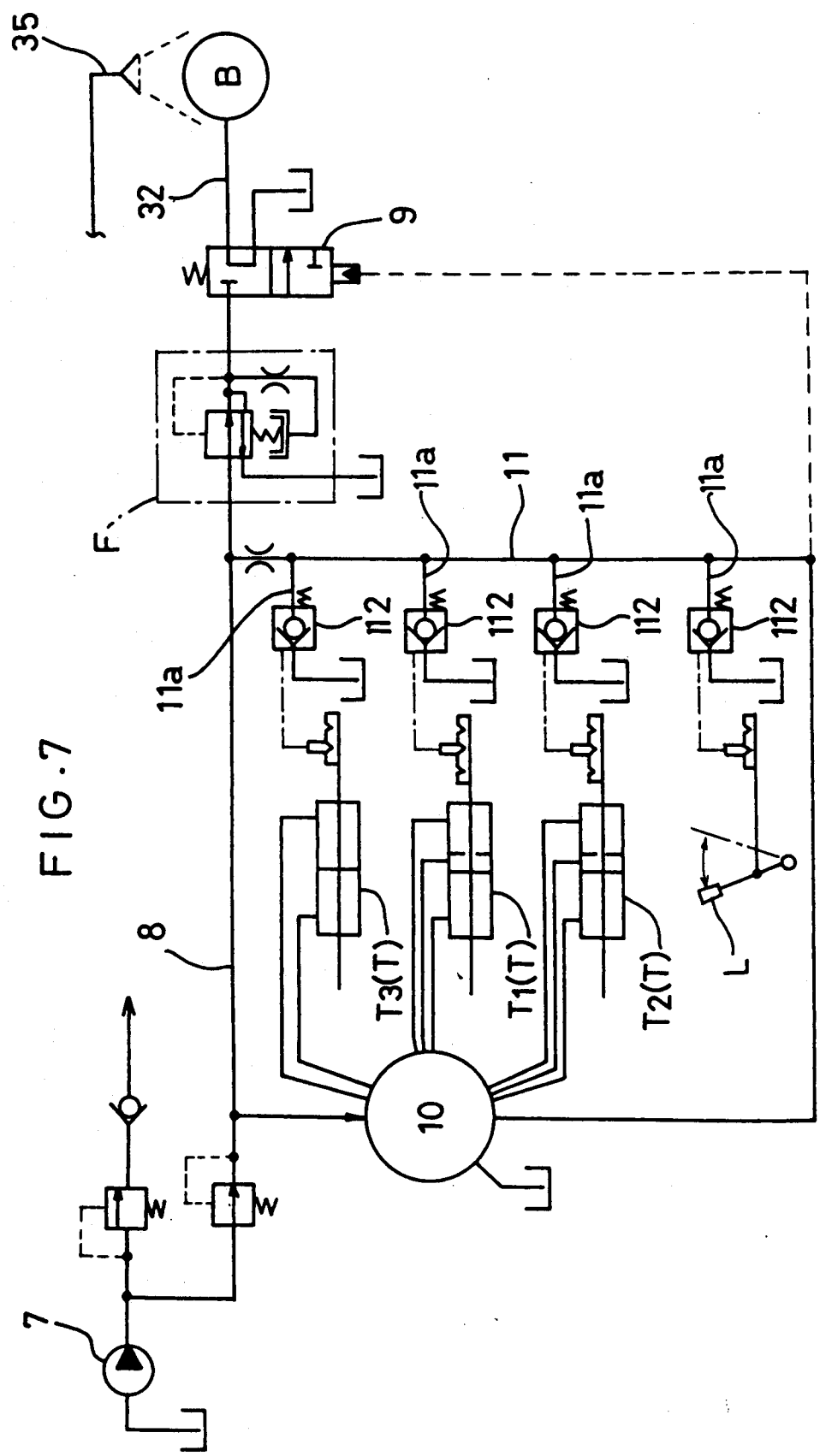
FIG. 7 is a diagram of a hydraulic circuitry for controlling change speed operations.

FIG. 7 shows this hydraulic control system which includes a pressure control mechanism F and a pilot operated switch valve 9 mounted on an oil line 8 for supplying pressure oil from a hydraulic pump 7 to the hydraulic clutch B. The control system further includes a rotary speed control valve 10 and a pilot oil line 11 branching from the oil line 8, the former for controlling the three hydraulic cylinders T1-T3 and the latter for providing a pilot pressure to control the switch valve 9.

Open/close type check valves 112 are mounted on control lines connected to the hydraulic cylinders T1-T3 and backward/forward changeover device C, respectively. These check valves 112 are operable to vary the pilot pressure for the switch valve 9 to engage and disengage the hydraulic clutch B.

The pressure control mechanism F acts to suppress a sudden increase in the clutch pressure and cause the clutch pressure to rise with appropriate characteristics when the switch valve 9 is engaged.

Referring to FIGS. 1 through 4, the transmission of this agricultural tractor is mounted in a transmission case including a main clutch housing 13, an intermediate case 14 and a rear case 15 interconnected in series. The main clutch housing 13 contains the main clutch 2 and main change speed device A. The intermediate case 14 contains the hydraulic clutch B and backward/forward changeover device C. The rear case 15 contains the auxiliary change speed device D and super-reduction device E.

The intermediate case 14 defines an opening 14a in a lateral wall thereof opposed to the hydraulic clutch B. Shift rods 17 connected to two main change speed shifters 16 and a shift rod 19 connected to an auxiliary change speed shifter 18 extend to the vicinity of the opening 14a. The three hydraulic cylinders T1-T3 are mounted on an inward face of a lid 20 closing the opening 14a, for operating these shift rods 17 and 19. The cylinders T1-T3 have piston rods 21 carrying brackets 21a at respective ends thereof connected through pins P to brackets 17a and 19a mounted at ends of the shift rods 17 and 19.

A shift rod 25 connected to a backward/forward changeover shifter 24 is interlocked with a control lever L.

Figure 1:
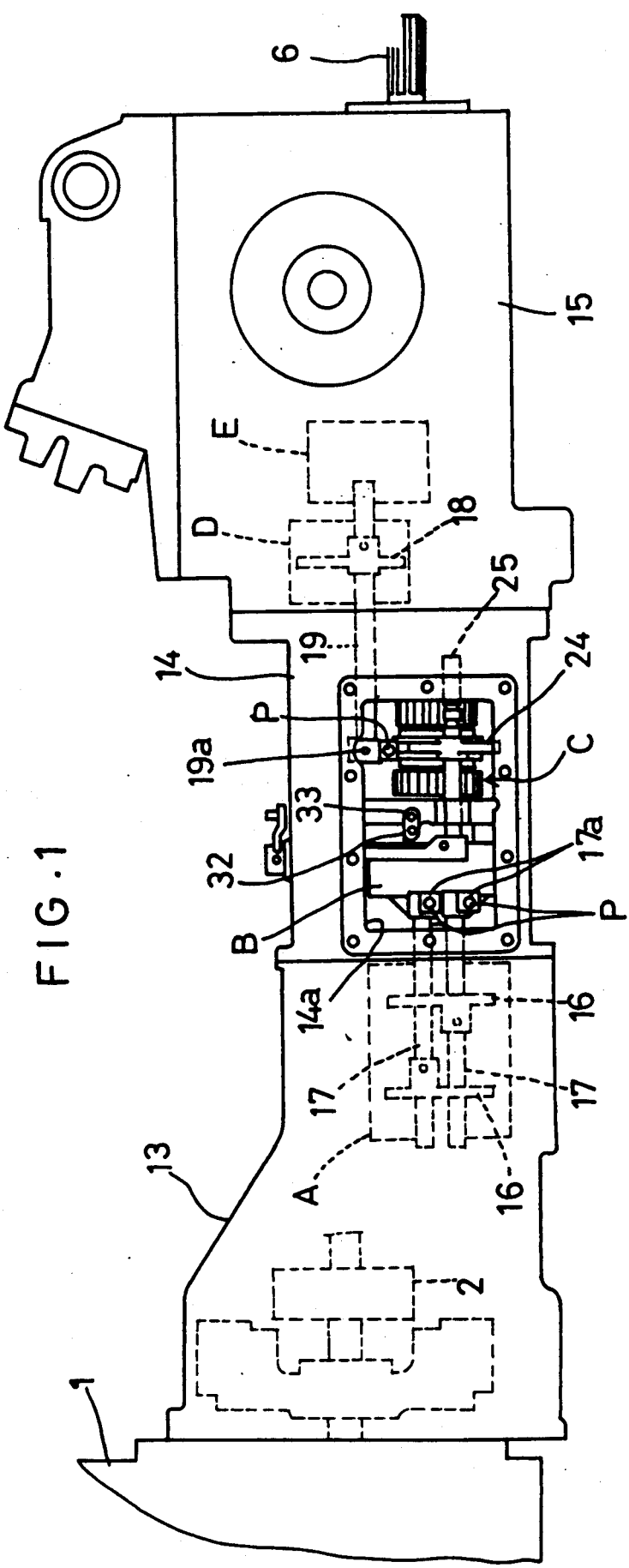
FIG. 1 is a side view of a transmission case.
Figure 2:
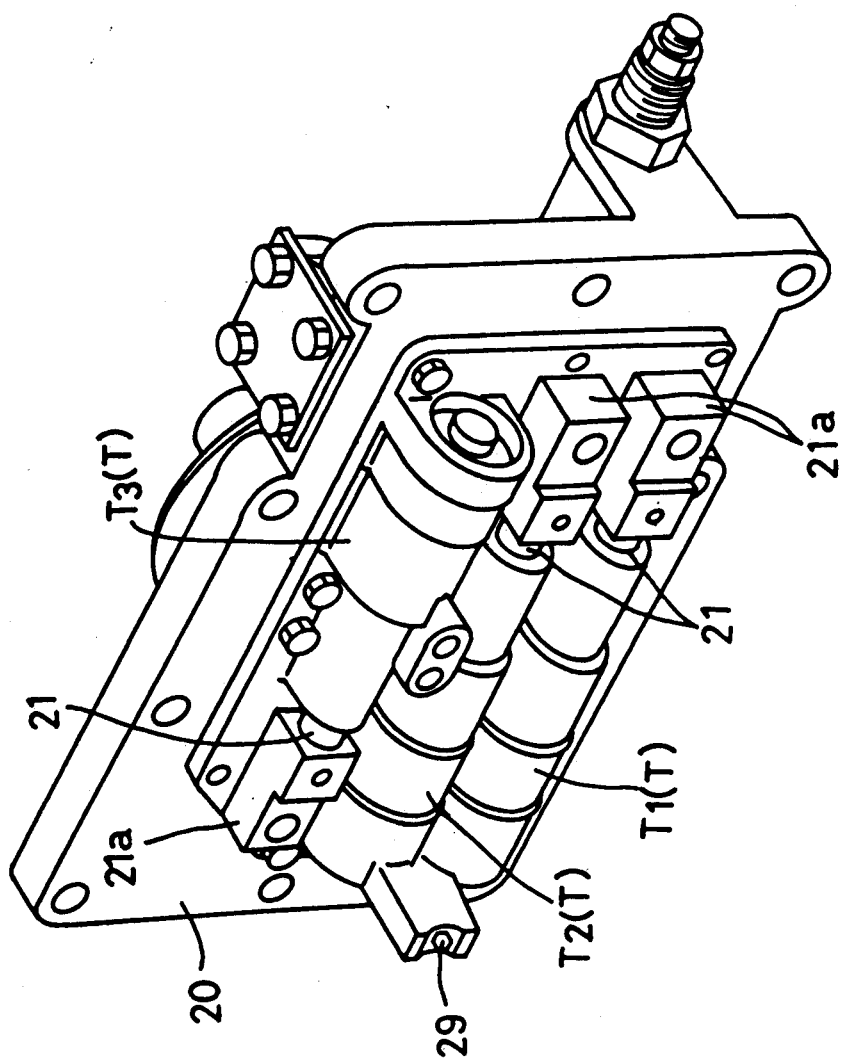
FIG. 2 is a perspective view of a lid and hydraulic devices.
Figure 3:
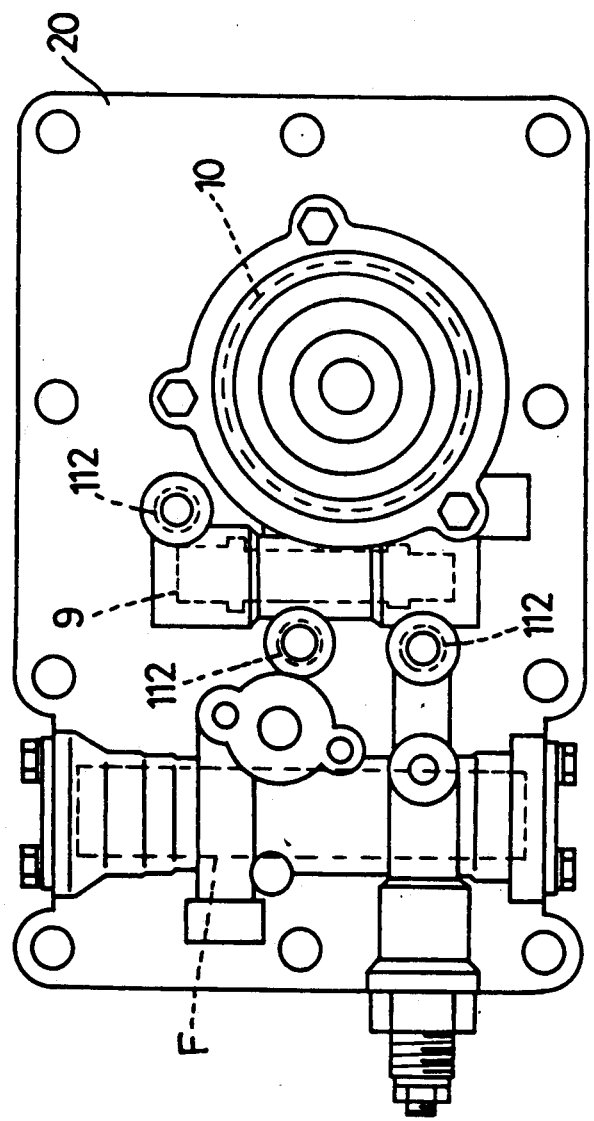
FIG. 3 is a side view of the lid.

As shown in FIG. 3, the lid 20 carries the pressure control mechanism F, switch valve 9 and speed control valve 10 on an outside face thereof. The check valves 112 are mounted inside the lid 20.

Thus the lid 20 is constructed to be compact by arranging the hydraulic devices in three layers as above.

Figure 8:
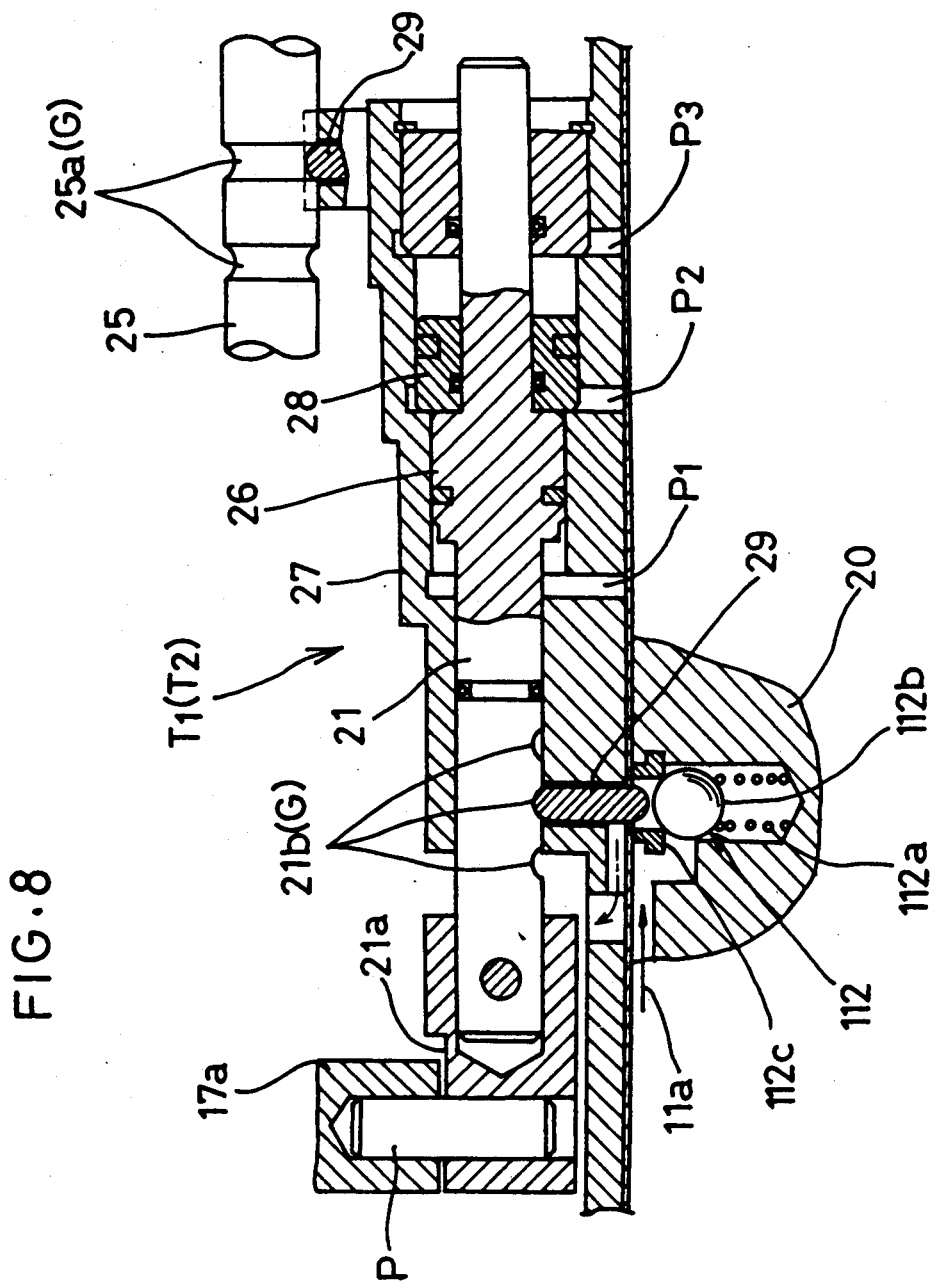
FIG. 8 is a sectional view of a hydraulic cylinder for effecting main change speed.

Referring to FIG. 8, each of the two main change speed hydraulic cylinders T1 and T2 comprises a piston section 26 including a pair of piston rods 21, a cylinder section 27 housing the piston section 26, and a movable piston 28 slidably mounted on the piston rod 21 inside the cylinder section 27. The cylinder section 27 defines three ports P1-P3. When pressure oil is supplied through end ports P1 and P3, the movable piston 28, as shown in FIG. 8, contacts a stepped portion of the cylinder section 27 and the piston section 26 contacts the movable piston 28 to provide a neutral position.

One of the piston rods 21 of each hydraulic cylinder T1 or T2 defines three grooves 21b providing cam surfaces G. A rod-like control element 29 engageable with the cam surfaces G extends into the lid 20. The check valve 112 (which is one example of control valves) mounted inside the lid 20 includes a spring 112a, a ball 112b and a ring holder 112c.

Figure 9:
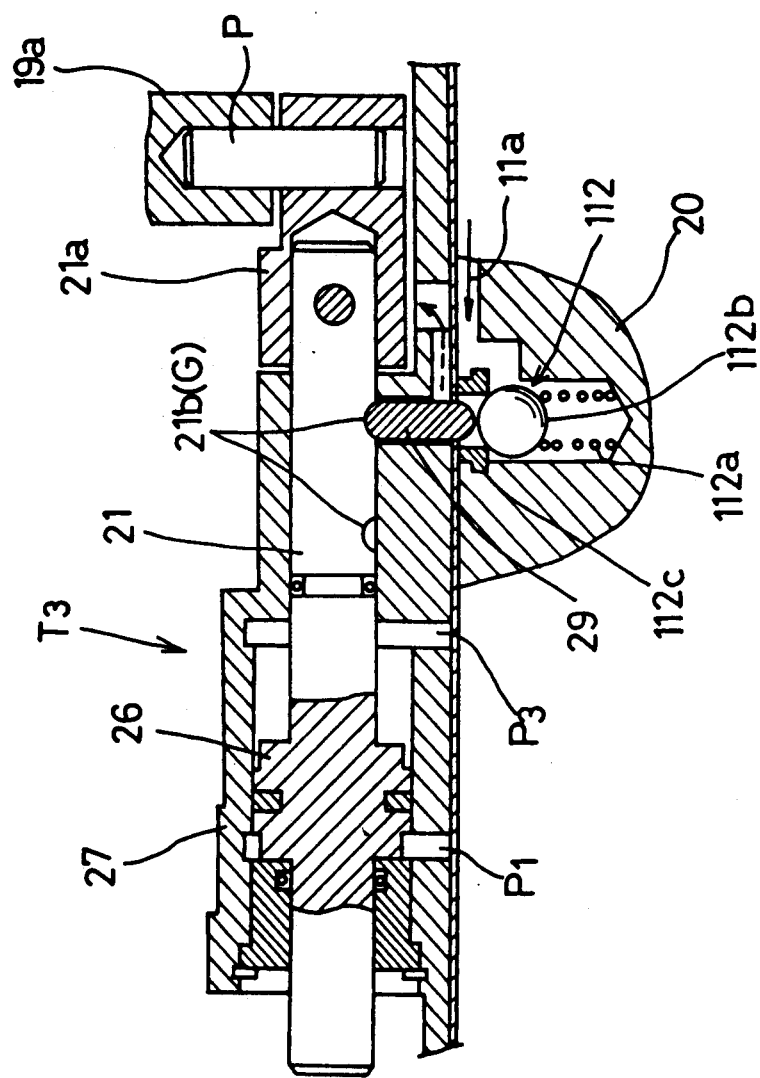
FIG. 9 is a sectional view of a hydraulic cylinder for effecting auxiliary change speed.

As shown in FIG. 9, the auxiliary change speed hydraulic cylinder T3, which does not require a neutral position, comprises a piston section 26 including a pair of piston rods 21, a cylinder section 27 housing the piston section 26, and two ports P1 and P3.

One of the piston rods 21 of this hydraulic cylinder T3 defines two grooves 21b providing cam surfaces G. These cam surfaces G are associated with the check valve 112 having a similar construction as the above check valve.

Figure 4:
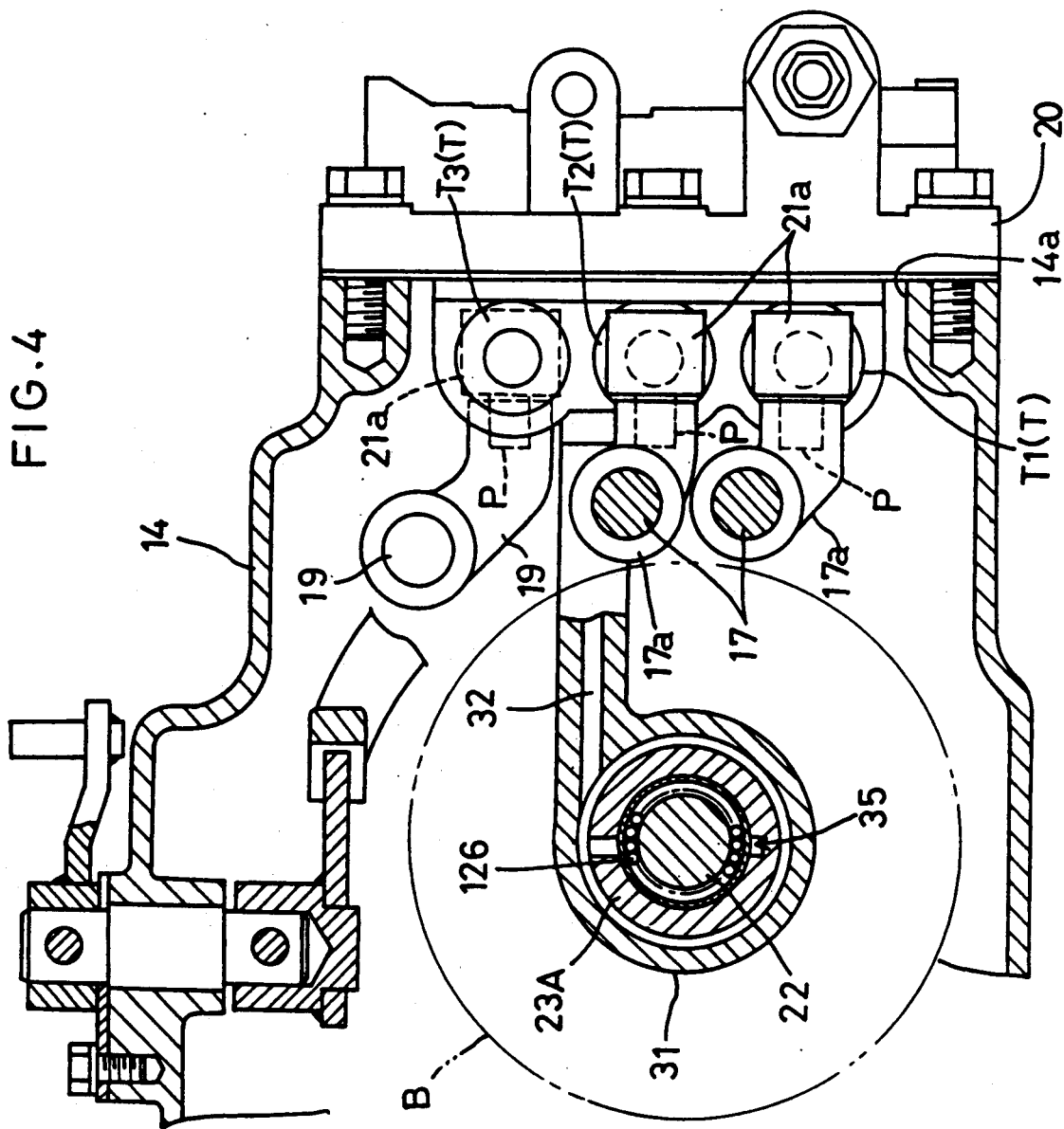
FIG. 4 is a sectional view showing a lid mounting position.

Referring to FIGS. 8 and 4, the three hydraulic cylinders T1-T3 are arranged in horizontal postures one over another on the inward face of the lid 20. The backward/forward changeover shift rod 25 is disposed at a level between the two lower cylinders T1 and T2. This shift rod 25 also defines two grooves 25a providing cam surfaces G. A control piece 29 engageable with these cam surfaces G extends through a position between the two hydraulic cylinders T1 and T2 to be interlocked with the check valve 112.

The check valves 112 invariably are constructed as shown in FIG. 8. That is, the control element 29 presses the ball 112b to open an exhaust oil line 11a communicating with the pilot oil line 11 to release the pressure of the pilot oil line 11 to a tank.

The foregoing embodiment may be modified in various ways. For example, the transmission case may comprise a single unit and may have many different configurations. The hydraulic actuators, switch valve, speed control valve and control valves may have varied constructions.

A transmission case without the lid 20 is used where a transmission for manually effecting change speed without involving hydraulic pressure.

Figure 5:
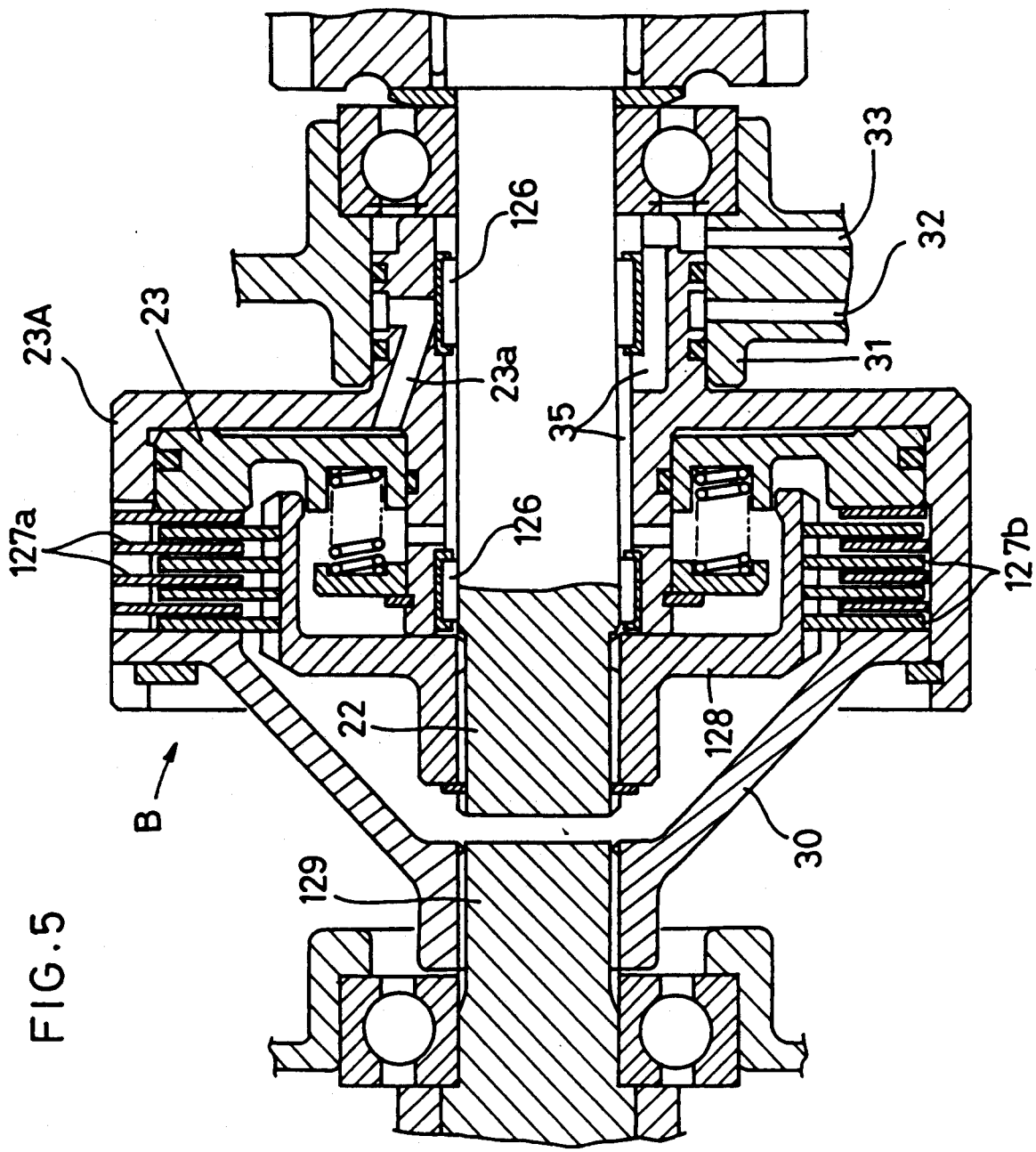
FIG. 5 is a sectional view of a hydraulic clutch.

Referring to FIG. 5, the hydraulic clutch B includes a clutch case 23A relatively rotatably mounted through needle bearings 126 on an input shaft 22 of the backward/forward changeover device C, a holder 128 splined to the input shaft 22, and a transmission member 30 fitted to the clutch case 23A and splined to an output shaft 129 of the main change speed device A. The clutch case 129 includes a hydraulic piston 23 and a plurality of friction plates 127a, while the holder 128 supports a plurality of friction plates 127b arranged between the friction plates 127a. A clutch operating oil passage 32 extends substantially linearly between the switch valve 9 supported by the lid 20 and a joint 31 fitted on a small diameter portion of the clutch case 23A. Pressure oil is supplied from this oil passage 32 to the hydraulic piston 23 through an oil passage 32a defined in the clutch case 23A.

Further, a lubricating oil passage 33 is connected to the joint 31 for supplying lubricating oil to the hydraulic clutch B. Lubricating oil supplied through the oil passage 33, as shown in FIG. 5, flows through a groove-like oil passage 35 defined outwardly of the needle bearing 126 and a further oil passage 35 defined between the input shaft 22 and clutch case 23A. Thus the lubricating oil, besides being supplied between the input shaft 22 and clutch case 23A, flows to the friction plates 127a and 127b from an inward position of the hydraulic clutch B.

The transmission member 30 has an end thereof extending into a friction plate supporting portion of the clutch case 23A.

The hydraulic clutch may be modified in various ways. For example, a gearing may be used for transmitting the drive from the output shaft 129 to the clutch case 23A.

Further, the hydraulic clutch operating system may be varied in many ways. For example, the speed control valve may include a control port and may be movable to a control position for operating the hydraulic clutch.

What is claimed is:

1. A speed control structure comprising;
    change speed means including a hydraulic clutch,
    a transmission case for housing said change speed means having an opening to expose said hydraulic clutch,
    a lid for closing said opening, and
    hydraulic control means for controlling said hydraulic clutch, said hydraulic control means including;
    hydraulic actuator means for effecting change speed,
    a speed control valve for controlling said hydraulic actuator means,
    a pilot operated switch valve mounted on an oil line extending to said hydraulic clutch and operatively connected to said hydraulic actuator means for disengaging said hydraulic clutch to start a change speed by said hydraulic actuator means, and engaging said hydraulic clutch upon completion of the change speed, and
    a pilot control valve for controlling pilot pressure for the switch valve in response to the operation of said hydraulic actuator means,
    wherein said lid carries said hydraulic actuator means mounted on an inside face thereof, said switch valve and said speed control valve mounted on an outside face thereof, and said pilot control valve mounted inside said transmission case.

2. A change speed structure as claimed in claim 1, wherein said change speed means includes a synchromesh main change speed device for changing an engine output into a plurality of speeds, and a synchromesh auxiliary change speed device for transmitting the engine output in a plurality of speeds to propelling devices, said main change speed device and said auxiliary change speed device being arranged longitudinally of a vehicle body with said hydraulic clutch disposed in between, and
    wherein shift rods linked with change speed sections of said main change speed device and said auxiliary change speed device, respectively, extend to positions adjacent said hydraulic clutch, said opening being disposed to allow exposure of extension ends of said shift rods and said hydraulic clutch.

3. A change speed structure as claimed in claim 1, wherein said hydraulic clutch is interposed between an output shaft of said main change speed device and an input shaft of said auxiliary change speed device, said hydraulic clutch including;
   a clutch case mounting said input shaft to receive drive from said output shaft, said clutch case having a hydraulic piston and a plurality of first friction plates.

* * * * *